(12) United States Patent
Morito

(10) Patent No.: US 7,188,990 B2
(45) Date of Patent: Mar. 13, 2007

(54) PLANAR LIGHT SOURCE DEVICE, LIQUID CRYSTAL DISPLAY APPARATUS HAVING THE PLANAR LIGHT SOURCE DEVICE AND METHOD FOR MANUFACTURING THEM

(75) Inventor: Yoshihiro Morito, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 11/221,818

(22) Filed: Sep. 9, 2005

(65) Prior Publication Data

US 2006/0062017 A1    Mar. 23, 2006

(30) Foreign Application Priority Data

Sep. 21, 2004    (JP) .............................. 2004-273682

(51) Int. Cl.
*F21V 8/00*    (2006.01)
(52) U.S. Cl. ...................... 362/634; 362/611; 362/614; 362/618
(58) Field of Classification Search ................ 362/600, 362/611, 617, 619, 634, 614, 609, 618, 31
See application file for complete search history.

(56) References Cited

U.S. PATENT DOCUMENTS

2006/0092661 A1* 5/2006 Inoue ......................... 362/600
2006/0239026 A1* 10/2006 Chen et al. ................. 362/600
2006/0239027 A1* 10/2006 Chen .......................... 362/600

FOREIGN PATENT DOCUMENTS

JP    2001-236812    8/2001

* cited by examiner

*Primary Examiner*—Laura K. Tso
(74) *Attorney, Agent, or Firm*—Oblon, Spivak, McClelland, Maier & Neustadt, P.C.

(57) ABSTRACT

A planar light source device comprises a light guide having a light entrance surface through which light enters, and a light exit surface, from which the light that entered through the light entrance surface exits, a light source disposed along the light entrance surface, and a reflecting body, which has two ends forming an opening to discharge the light emitted from the light source and sandwiching the light guide in a thickness direction, surrounds the light source, and reflects the light emitted from the light source toward the light entrance surface. The light exit surface has a grained surface region where a convex dot pattern is formed and a positioning region where no dot pattern is formed. One of the two ends of the reflecting body, which is brought into contact with the light exit surface, has an edge that is positioned in the positioning region.

12 Claims, 4 Drawing Sheets

PLANAR LIGHT SOURCE DEVICE, LIQUID CRYSTAL DISPLAY APPARATUS HAVING THE PLANAR LIGHT SOURCE DEVICE AND METHOD FOR MANUFACTURING THEM

CROSS-REFERENCE TO RELATED APPLICATIONS

This application is based upon and claims the benefit of priority from prior Japanese Patent Application No. 2004-273682, filed Sep. 21, 2004, the entire contents of which are incorporated herein by reference.

BACKGROUND OF THE INVENTION

1. Field of the Invention

The present invention relates to a planar light source device comprising a light guide having a light exit surface on which a dot pattern is formed, a liquid crystal display apparatus using the planar light source device, and a method for manufacturing them.

2. Description of the Related Art

In recent years, liquid crystal display apparatuses are utilized in various fields, making full use of its advantage of thinness and lightness.

Generally, a liquid crystal display apparatus has a liquid crystal display panel which displays an input image, and a planar light source device which illuminates the liquid crystal display panel from behind it. The planar light source device comprises a light source, a light guide which receives the light emitted from the light source and exits the light, and a reflector which causes the light emitted from the light source to be incident on the light guide.

The light exit surface of the light guide is covered with a plurality of optical sheets to uniform the brightness of light or improve the brightness, and the surface opposite to the light exit surface is covered with a reflection sheet. Recently, in order to reduce the number of optical sheets, a type of planar light source device has been developed, in which a light guide has a grained surface having a convex dot pattern as a light exit surface. The dot pattern on the light exit surface is formed such that the density of dots increases as the distance from the light source increases. With this arrangement, the planar light that exits from the light exit surface is uniformed.

In the planar light source device described above, the reflector has two ends, which form openings through which light emitted from the light source is discharged. The reflector surrounds the light source such that the two ends sandwich the light guide and the reflection sheet in the thickness direction thereof. With this structure, the light emitted from the light source can be utilized efficiently, and therefore, the brightness can be increased.

When the light is discharged from the reflector, the positional relationship between the reflector and the light guide greatly influences the evenness of the brightness of the emitted light. The conventional planar light source device has the following problem: since it is difficult to position the reflector relative to the light guide, positioning of the central portion of the reflector especially requires a long time.

To solve the above problem, a method of forming a step or groove in the light guide has been proposed to make the positioning of the reflector easier.

The above method requires that a step or groove be formed on the light exit surface of the light guide. Therefore, this method is not suitable for the case of using a light guide, which has a grained surface as the light exit surface.

BRIEF SUMMARY OF THE INVENTION

The present invention has been made to solve the above problem of the conventional art. An object of the present invention is to provide a planar light source device and a liquid crystal display apparatus using the planar light source device, in which the reflector can be positioned relative to the light guide easily and unevenness of the brightness is prevented.

According to an aspect of the present invention, there is provided a planar light source device comprising: a light guide having a light entrance surface through which light enters, and a light exit surface, from which the light that entered through the light entrance surface exits; a light source disposed along the light entrance surface of the light guide; and a reflecting body, which has two ends forming an opening to discharge the light emitted from the light source and sandwiching the light guide in a thickness direction, surrounds the light source, and reflects the light emitted from the light source toward the light entrance surface of the light guide, wherein: the light exit surface of the light guide has a grained surface region where a convex dot pattern is formed and a positioning region where no dot pattern is formed; and one of the two ends of the reflecting body, which is brought into contact with the light exit surface, has an edge that is positioned in the positioning region.

According to another aspect of the present invention, there is provided a method for manufacturing a planar light source device comprising: a light guide having a light entrance surface through which light enters, and a light exit surface, from which the light that entered through the light entrance surface exits; a light source disposed along the light entrance surface of the light guide; and a reflecting body, which has two ends forming an opening to discharge the light emitted from the light source and sandwiching the light guide in a thickness direction, surrounds the light source, and reflects the light emitted from the light source toward the light entrance surface of the light guide, the method comprising: forming, on the light exit surface of the light guide, a grained surface region where a convex dot pattern is formed and a positioning region where no dot pattern is formed; and attaching the reflecting body to the light guide such that an edge of one of the two ends of the reflecting body, which is brought into contact with the light exit surface, is positioned in the positioning region.

According to still another embodiment of the present invention, there is provided a liquid crystal display apparatus comprising: a liquid crystal display panel including a display region in which a plurality of pixels are arrayed; a circuit board, which is electrically connected to the liquid crystal display panel and supplies a driving signal to the liquid crystal display panel; a planar light source device which illuminates the liquid crystal display panel from behind it, the planar light source device comprising: a light guide having a light entrance surface through which light enters, and a light exit surface, from which the light that entered through the light entrance surface exits; a light source disposed along the light entrance surface of the light guide; and a reflecting body, which has two ends forming an opening to discharge the light emitted from the light source and sandwiching the light guide in a thickness direction, surrounds the light source, and reflects the light emitted from the light source toward the light entrance surface of the light guide, wherein: the light exit surface of the light guide has a grained surface region where a convex dot pattern is formed and a positioning region where no dot pattern is formed; and one of the two ends of the reflecting body, which is brought into contact with the light exit surface, has an edge that is positioned in the positioning region.

According to a further embodiment of the present invention, there is provided a method for manufacturing a liquid crystal display apparatus comprising: a liquid crystal display panel including a display region in which a plurality of pixels are arrayed; a circuit board, which is electrically connected to the liquid crystal display panel and supplies a driving signal to the liquid crystal display panel; a planar light source device which illuminates the liquid crystal display panel from behind it, the planar light source device comprising: a light guide having a light entrance surface through which light enters, and a light exit surface, from which the light that entered through the light entrance surface exits; a light source disposed along the light entrance surface of the light guide; and a reflecting body, which has two ends forming an opening to discharge the light emitted from the light source and sandwiching the light guide in a thickness direction, surrounds the light source, and reflects the light emitted from the light source toward the light entrance surface of the light guide, the method comprising: forming, on the light exit surface of the light guide, a grained surface region where a convex dot pattern is formed and a positioning region where no dot pattern is formed; and attaching the reflecting body to the light guide such that one of the two ends of the reflecting body, which is brought into contact with the light exit surface, is positioned in the positioning region.

According to the present invention, it is possible to provide a planar light source device and a liquid crystal display apparatus using the planar light source device, in which the reflector can be positioned relative to the light guide easily and unevenness of the brightness is prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A planar light source device, a liquid crystal display apparatus using the planar light source device, and a method for manufacturing them, will be described below with reference to the accompanying drawings.

Figure 1:
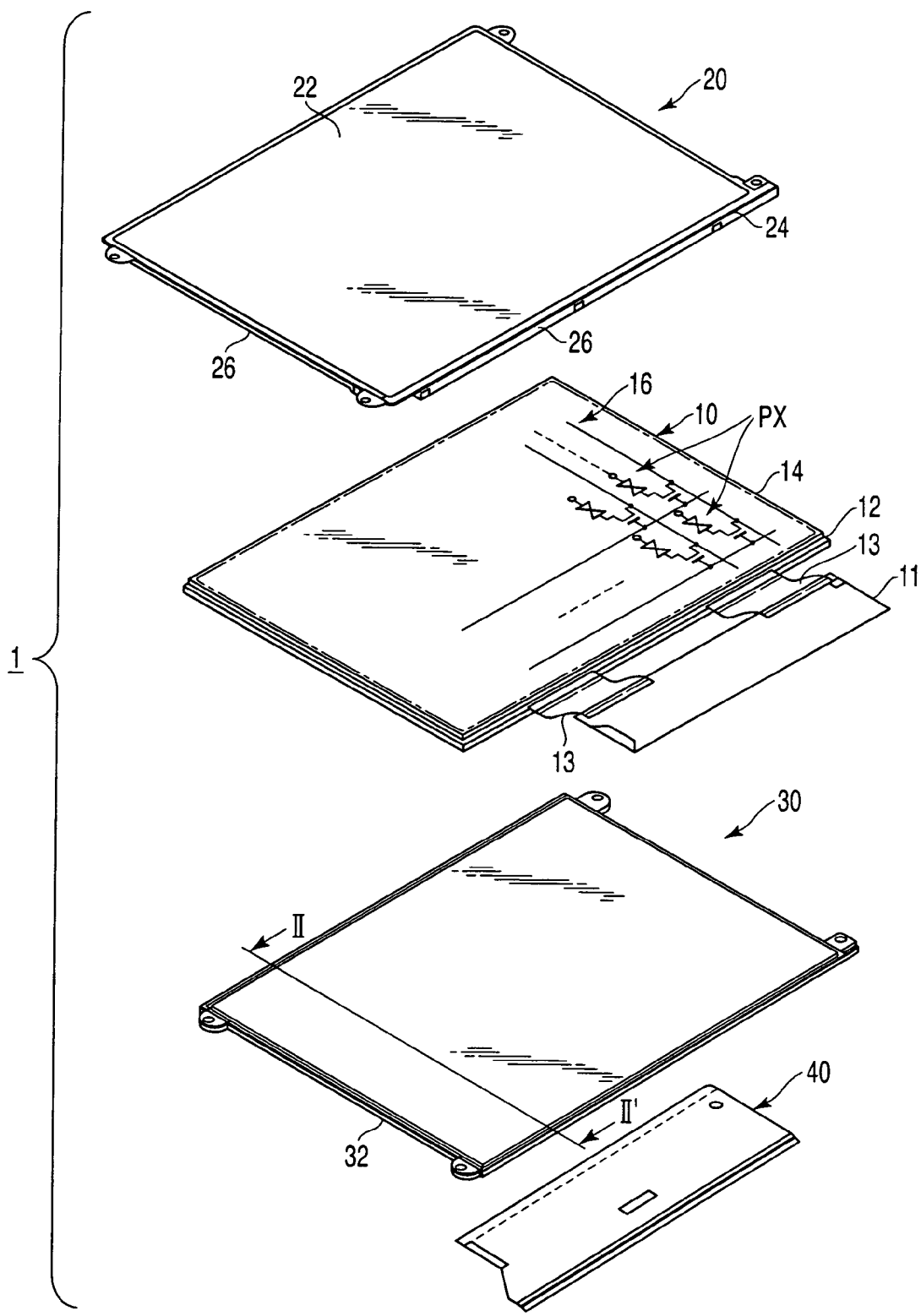
FIG. 1 is an exploded perspective view showing an example of the structure of a liquid crystal display apparatus according to a first embodiment of the present invention.

FIG. 1 is an exploded perspective view showing an example of the structure of a liquid crystal display apparatus according to a first embodiment of the present invention. As shown in FIG. 1, the liquid crystal display apparatus 1 comprises a liquid crystal display panel 10 which is approximately rectangular; a planar light source device 30 which illuminates the liquid crystal display panel 10 from behind it; a back frame 32 which supports the liquid crystal display panel 10 and the planar light source device 30; and a bezel cover 20 which is attached to the back frame 32 and holds the peripheral portion of the liquid crystal display panel 10. The planar light source device 30 is attached to the back surface of the liquid crystal display panel 10. The bezel cover 20, which is rectangular, is attached to the front surface of the liquid crystal display panel 10.

The liquid crystal display panel 10 comprises an array substrate 12 and a counter substrate 14, which are arranged opposite to each other. A liquid crystal layer is sandwiched between the array substrate 12 and the counter substrate 14. A polarizing plate (not shown) is attached to the outer surface of each of the array substrate 12 and the counter substrate 14. The liquid crystal display panel 10 has a rectangular effective display section 16, which corresponds to a display region to display images. The effective display section 16 comprises a plurality of display pixels PX, which are arranged in a matrix.

An elongated rectangular flat driver circuit board 11, which supplies a driving signal to the liquid crystal display panel 10, is electrically connected to a side end of the liquid crystal display panel 10 via a pair of printed wiring boards 13. Each of the printed wiring boards 13 is a flexible elongated rectangular plate. The printed wiring boards 13 are bent to the back surface of the planar light source device 30, with the result that the driver circuit board 11 is arranged on the back surface of the planar light source device 30. In this state, an elongated rectangular insulating sheet 40 is interposed between the driver circuit board 11 and the planar light source device 30. The insulating sheet 40 ensures the insulation between the driver circuit board 11 and the planar light source device 30.

Figure 2:
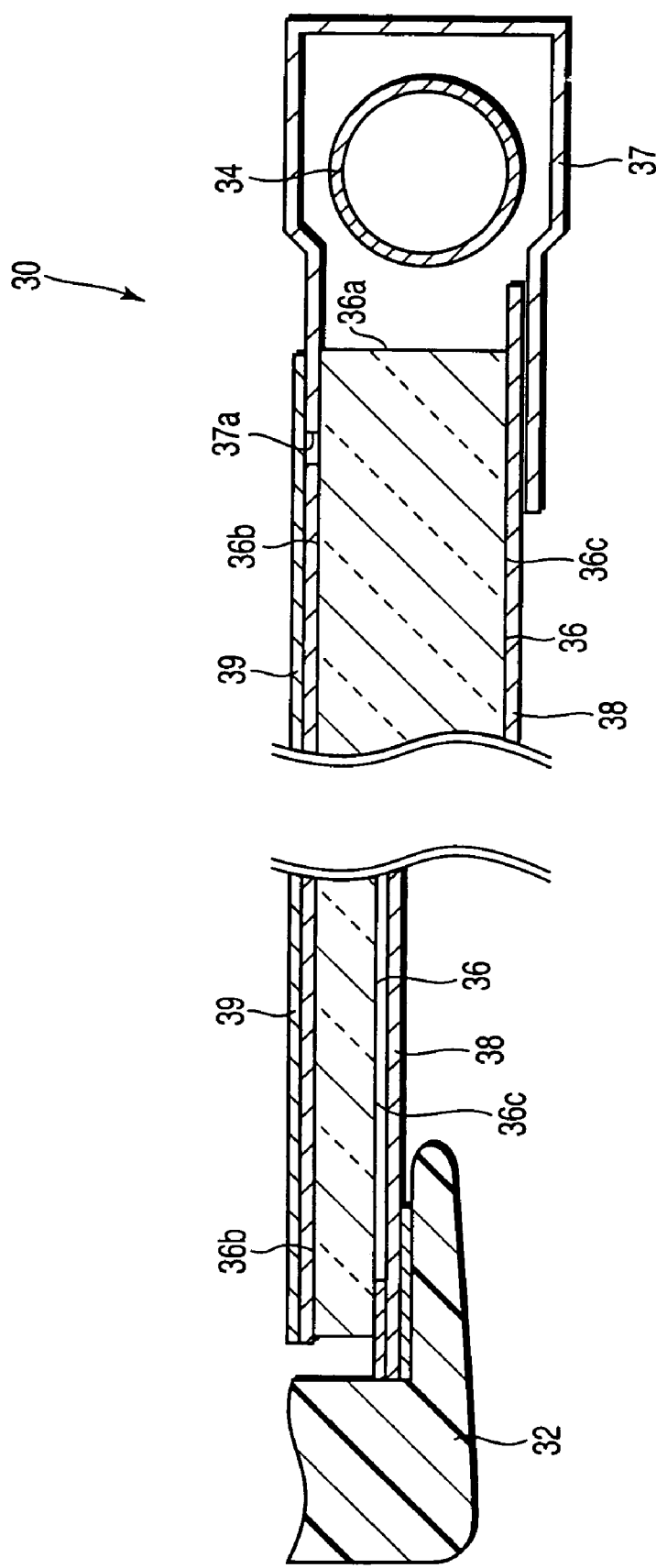
FIG. 2 is a cross-sectional view of the planar light source device shown in FIG. 1 taken along the line II–II'.

FIG. 2 is a cross-sectional view of the planar light source device shown in FIG. 1 taken along the line II–II'. The planar light source device 30 comprises a light guide 36 shaped as a rectangular plate. The light guide 36 has a light entrance surface 36a through which light enters, a light exit surface 36b, from which the light exits, and a counter surface 36c opposing to the light exit surface 36b. As will be described later, the counter surface 36c is prism-shaped. Thus, the light guide 36 is formed as a prism-integrated light guide.

A plurality of optical sheets 39 are arranged on the light exit surface 36b of the light guide 36. The optical sheets 39 impart predetermined optical characteristics to the light that exits from the light exit surface 36b of the light guide 36. For example, the optical sheets 39 may be a light collecting sheet which collects the light that exits from the light exit surface 36b, a light diffusing sheet which diffuses the light that exits from the light exit surface 36b. A reflecting sheet 38, as an optical sheet, is arranged on the counter surface 36c of the light guide 36. The reflecting sheet 38 reflects the light, which is leaked out of the light guide 36 through the counter surface 36c, towards the light exit surface 36b of the light guide 36.

A cold cathode fluorescent tube 34, as a light source, is arranged to face the light entrance surface 36a of the light guide 36. A reflector 37, as a reflecting body, surrounds the cold cathode fluorescent tube 34.

The reflector 37 is formed by bending a substantially plate-shaped reflecting member such that the cross section is substantially U-shaped. It has a pair of ends, which defines an opening. The paired ends sandwich the light guide 36 and the reflecting sheet 38 in the thickness direction thereof. The light entrance surface 36a and the reflector 37 surround the cold cathode fluorescent tube 34 throughout the length of the light guide 36 in the longitudinal direction. The reflector 37 reflects the light emitted from the cold cathode fluorescent tube 34 toward the light entrance surface 36a. The thickness direction of the light guide 36 is substantially perpendicular to the light exit surface 36b.

Figure 3:
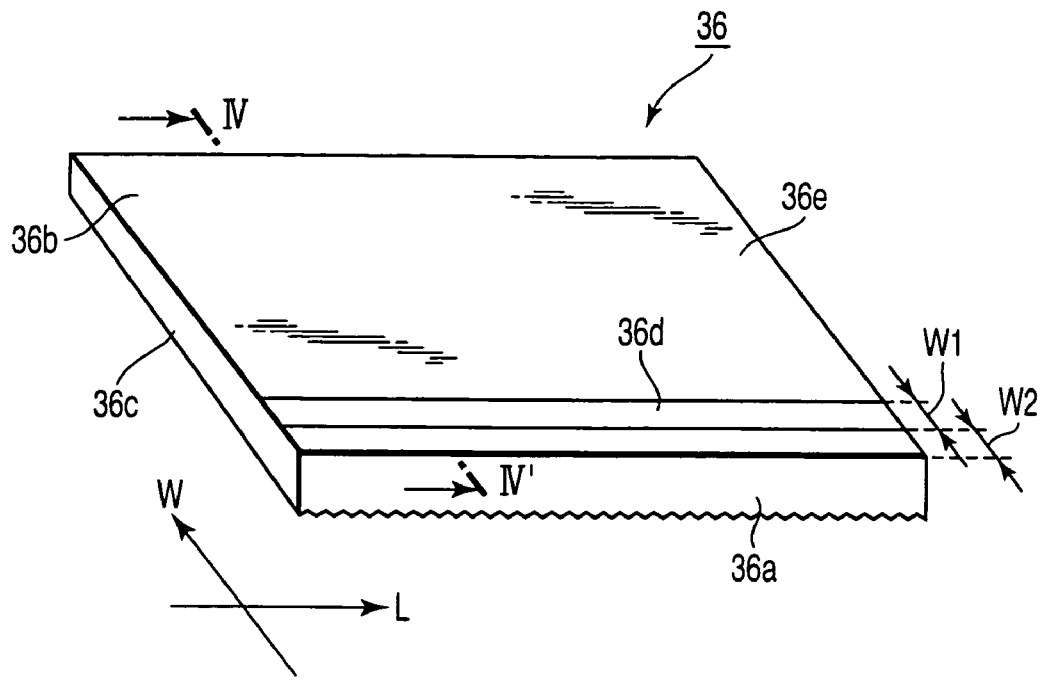
FIG. 3 is a view showing an example of the structure of the light guide shown in FIG. 2.
Figure 4:
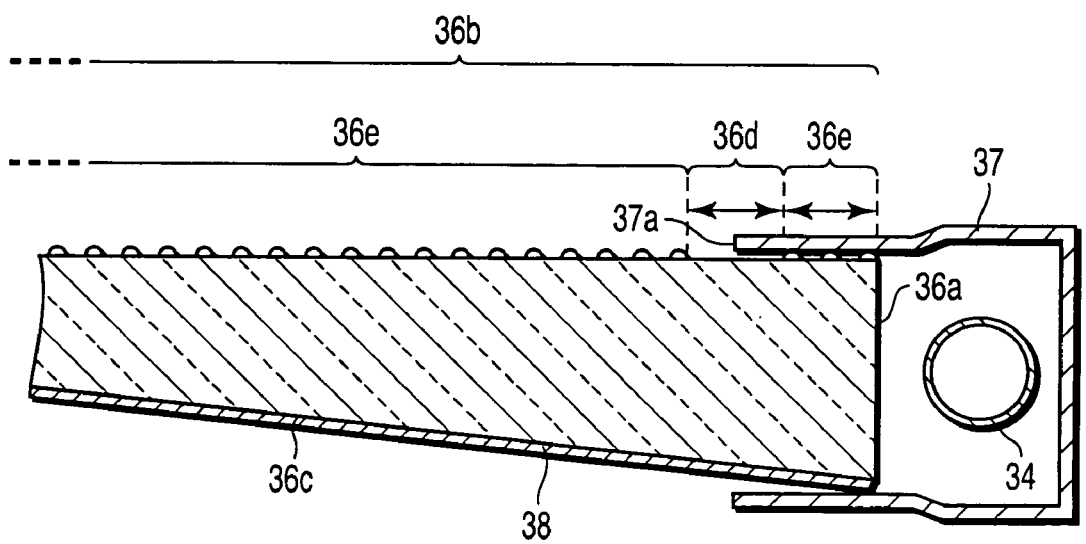
FIG. 4 is a cross-sectional view of the light guide shown in FIG. 3, to which the reflector is attached, taken along the line IV–IV'.

FIG. 3 shows the light guide 36 of the planar light source device 30 shown in FIG. 2. FIG. 4 is a cross-sectional view of the light guide 36 shown in FIG. 3, to which the reflector 37 is attached, taken along the line IV–IV'.

As shown in FIG. 3, the light guide 36 has a wedge shape, whose thickness is gradually smaller as the distance from the light entrance surface 36a increases. With this shape, space for the driver circuit board 11 etc. is provided on the side of the counter surface 36c of the light guide 36.

Prisms are formed integrally with the counter surface 36c of the light guide 36. The prisms uniformly reflect the light incident on the light entrance surface 36a toward the light exit surface 36b. In this embodiment, the prisms formed on the counter surface 36c extend in the width direction of the counter surface 36c and are arranged side by side in the longitudinal direction. The longitudinal direction of the counter surface 36c corresponds to the direction indicated by the allow L in FIG. 3, and the width direction thereof corresponds to the direction indicated by the allow W in FIG. 3.

As shown in FIG. 4, the light exit surface 36b of the light guide 36 has a grained surface region 36e on which a convex dot pattern is formed, and a positioning region 36d on which no dot pattern is formed. In this embodiment, the positioning region 36d is formed as a band, which extends in the longitudinal direction of the light exit surface 36c. The positioning region 36d has a width W1 of approximately 1 mm, and is formed on the light exit surface 36b at a distance W2, approximately 0.5 mm, from the side of the light entrance surface 36a.

One of the paired ends of the reflector 37, which is brought into contact with the light exit surface 36b when the reflector 37 is attached to the light guide 36, has an edge 37a that is positioned in the positioning region 36d of the light exit surface 36b. At this time, it is preferable that the edge 37a be 0.5 mm to 1.5 mm apart from the side of the light entrance surface 36a.

Owing to the provision of the positioning region 36d in the light exit surface 36b of the light guide 36 as described above, the position of the reflector 37 can be determined such that the edge 37a is located in the positioning region 36d. Therefore, even if the dot pattern is formed on the light exit surface 36b of the light guide 36, the reflector 37 can be easily positioned with respect to the light guide 36, thereby reducing the variance of the position of the reflector 37 relative to the light guide 36. As a result, the brightness of the light that exits from the light exit surface 36b can be uniform.

Figure 5:
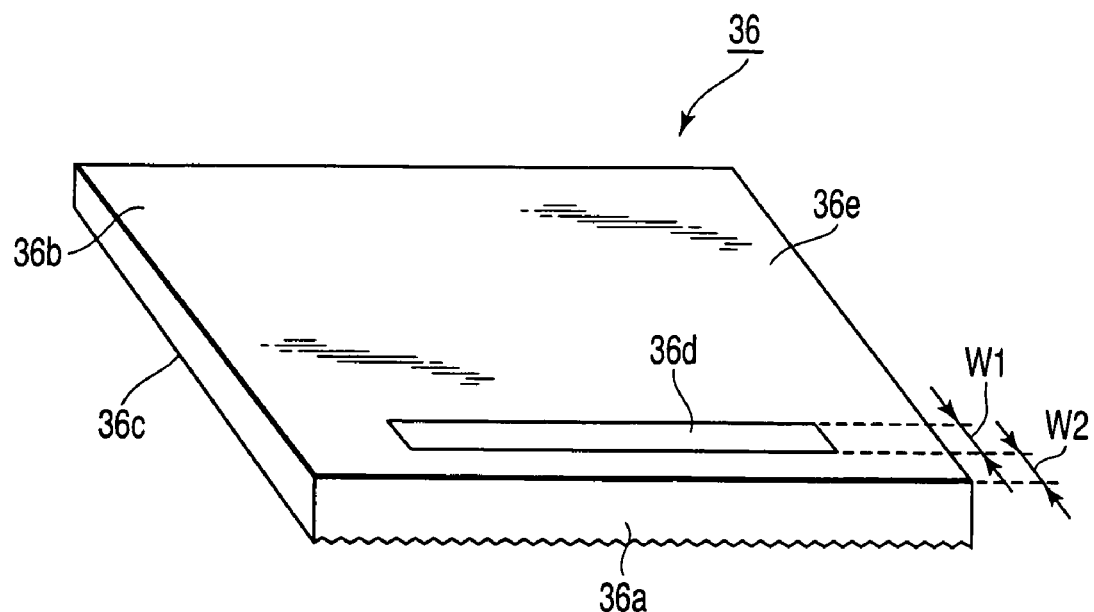
FIG. 5 is a view showing an example of the structure of a light guide according to a second embodiment of the present invention.

In the above embodiment, the positioning region 36d is shaped as a band, which extends substantially parallel to the light entrance surface 36a. However, as shown in FIG. 5, the positioning region 36d may have a substantially rectangular shape having a length in the longitudinal direction shorter than the light exit surface 36b and a width W1 of approximately 1 mm. The positioning region 36d extends substantially parallel to the light entrance surface 36a and locates in a central portion of one side of the light exit surface 36b along the longitudinal direction thereof.

Figure 6:
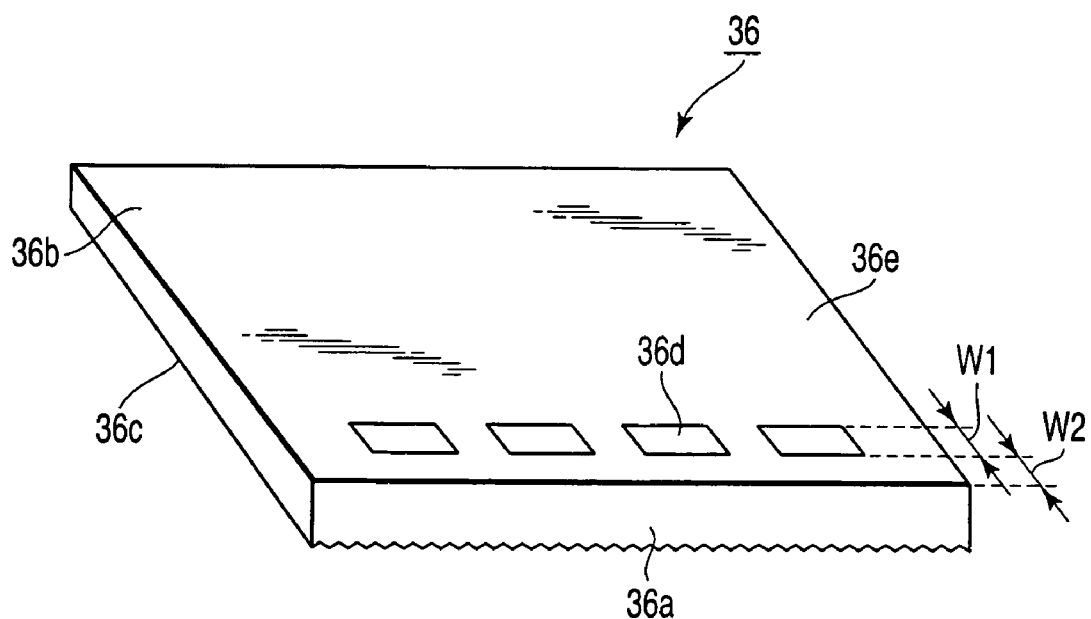
FIG. 6 is a view showing an example of the structure of a light guide according to a third embodiment of the present invention.

Alternatively, as shown in FIG. 6, the positioning region 36d may comprise a plurality of parts, having a width W1 of approximately 1 mm and arranged like a broken line substantially parallel to the light entrance surface 36a.

Each of the light guides 36 shown in FIGS. 5 and 6 has substantially the same structure as that shown in FIG. 3 except for the positioning region 36d and the description the other portions are omitted.

In the embodiment shown in FIGS. 5 and 6, the reflector 37 is positioned with respect to the light guide 36 in the same manner as shown in FIG. 4. Thus, the central portion of the reflector 37, which is especially difficult to position, can be easily positioned. Therefore, although the light guide 36 has a dot pattern on the light exit surface 36b, the variance of the position of the reflector 37 relative to the light guide 36 can be reduced. As a result, the brightness of the light that exits from the light exit surface 36b can be uniform.

In the above embodiments, the prisms are formed on the counter surface 36c of the light guide 36. However, prisms need not be formed on the counter surface 36c. In this case, an optical sheet that imparts the same optical characteristics as those of prisms to light is disposed on the light exit surface 36b or the counter surface 36c of the light guide 36, so that the same advantage as that of the above embodiments can be obtained.

The present invention is not limited to the above-mentioned embodiments, and the structural elements can be variously modified when practiced without departing from the scope of the invention. Further, some of the plurality of structural elements of the above embodiments described above may be suitably combined, so that various inventions may be achieved. For example, some of the structural elements may be deleted from all structural elements of an embodiment. Furthermore, structural elements of different embodiments may be suitably combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A planar light source device comprising:
   a light guide having a light entrance surface through which light enters, and a light exit surface, from which the light that entered through the light entrance surface exits;
   a light source disposed along the light entrance surface of the light guide; and
   a reflecting body, which has two ends forming an opening to discharge the light emitted from the light source and sandwiching the light guide in a thickness direction, surrounds the light source, and reflects the light emitted from the light source toward the light entrance surface of the light guide, wherein:

the light exit surface of the light guide has a grained surface region where a convex dot pattern is formed and a positioning region where no dot pattern is formed; and one of the two ends of the reflecting body, which is brought into contact with the light exit surface, has an edge that is positioned in the positioning region.

2. The planar light source device according to claim 1, wherein the positioning region is formed as a band, which extends substantially parallel to the light entrance surface.

3. The planar light source device according to claim 1, wherein the positioning region comprises a plurality of parts arranged like a broken line extending substantially parallel to the light entrance surface.

4. The planar light source device according to claim 2, wherein the positioning region has a length in a longitudinal direction shorter than that of the light exit surface.

5. The planar light source device according to claim 1, wherein the positioning region has a width of approximately 1 mm, and is arranged on the light exit surface at a distance of approximately 0.5 mm from a side of the light entrance surface.

6. A method for manufacturing a planar light source device comprising:

a light guide having a light entrance surface through which light enters, and a light exit surface, from which the light that entered through the light entrance surface exits;

a light source disposed along the light entrance surface of the light guide; and a reflecting body, which has two ends forming an opening to discharge the light emitted from the light source and sandwiching the light guide in a thickness direction, surrounds the light source, and reflects the light emitted from the light source toward the light entrance surface of the light guide, the method comprising:

forming, on the light exit surface of the light guide, a grained surface region where a convex dot pattern is formed and a positioning region where no dot pattern is formed; and attaching the reflecting body to the light guide such that an edge of one of the two ends of the reflecting body, which is brought into contact with the light exit surface, is positioned in the positioning region.

7. A liquid crystal display apparatus comprising:

a liquid crystal display panel including a display region in which a plurality of pixels are arrayed;

a circuit board, which is electrically connected to the liquid crystal display panel and supplies a driving signal to the liquid crystal display panel;

a planar light source device which illuminates the liquid crystal display panel from behind it, the planar light source device comprising:

a light guide having a light entrance surface through which light enters, and a light exit surface, from which the light that entered through the light entrance surface exits;

a light source disposed along the light entrance surface of the light guide; and a reflecting body, which has two ends forming an opening to discharge the light emitted from the light source and sandwiching the light guide in a thickness direction, surrounds the light source, and reflects the light emitted from the light source toward the light entrance surface of the light guide, wherein:

the light exit surface of the light guide has a grained surface region where a convex dot pattern is formed and a positioning region where no dot pattern is formed; and one of the two ends of the reflecting body, which is brought into contact with the light exit surface, has an edge that is positioned in the positioning region.

8. The liquid crystal display apparatus according to claim 7, wherein the positioning region is formed as a band, which extends substantially parallel to the light entrance surface.

9. The liquid crystal display apparatus according to claim 7, wherein the positioning region comprises a plurality of parts arranged like a broken line extending substantially parallel to the light entrance surface.

10. The liquid crystal display apparatus according to claim 8, wherein the positioning region has a length in a longitudinal direction shorter than that of the light exit surface.

11. The liquid crystal display apparatus according to claim 7, wherein the positioning region has a width of approximately 1 mm, and is arranged on the light exit surface at a distance of approximately 0.5 mm from a side of the light entrance surface.

12. A method for manufacturing a liquid crystal display apparatus comprising:

a liquid crystal display panel including a display region in which a plurality of pixels are arrayed;

a circuit board, which is electrically connected to the liquid crystal display panel and supplies a driving signal to the liquid crystal display panel;

a planar light source device which illuminates the liquid crystal display panel from behind it, the planar light source device comprising:

a light guide having a light entrance surface through which light enters, and a light exit surface, from which the light that entered through the light entrance surface exits;

a light source disposed along the light entrance surface of the light guide; and a reflecting body, which has two ends forming an opening to discharge the light emitted from the light source and sandwiching the light guide in a thickness direction, surrounds the light source, and reflects the light emitted from the light source toward the light entrance surface of the light guide, the method comprising:

forming, on the light exit surface of the light guide, a grained surface region where a convex dot pattern is formed and a positioning region where no dot pattern is formed; and attaching the reflecting body to the light guide such that one of the two ends of the reflecting body, which is brought into contact with the light exit surface, is positioned in the positioning region.

* * * * *